United States Patent Office 3,829,458
Patented Aug. 13, 1974

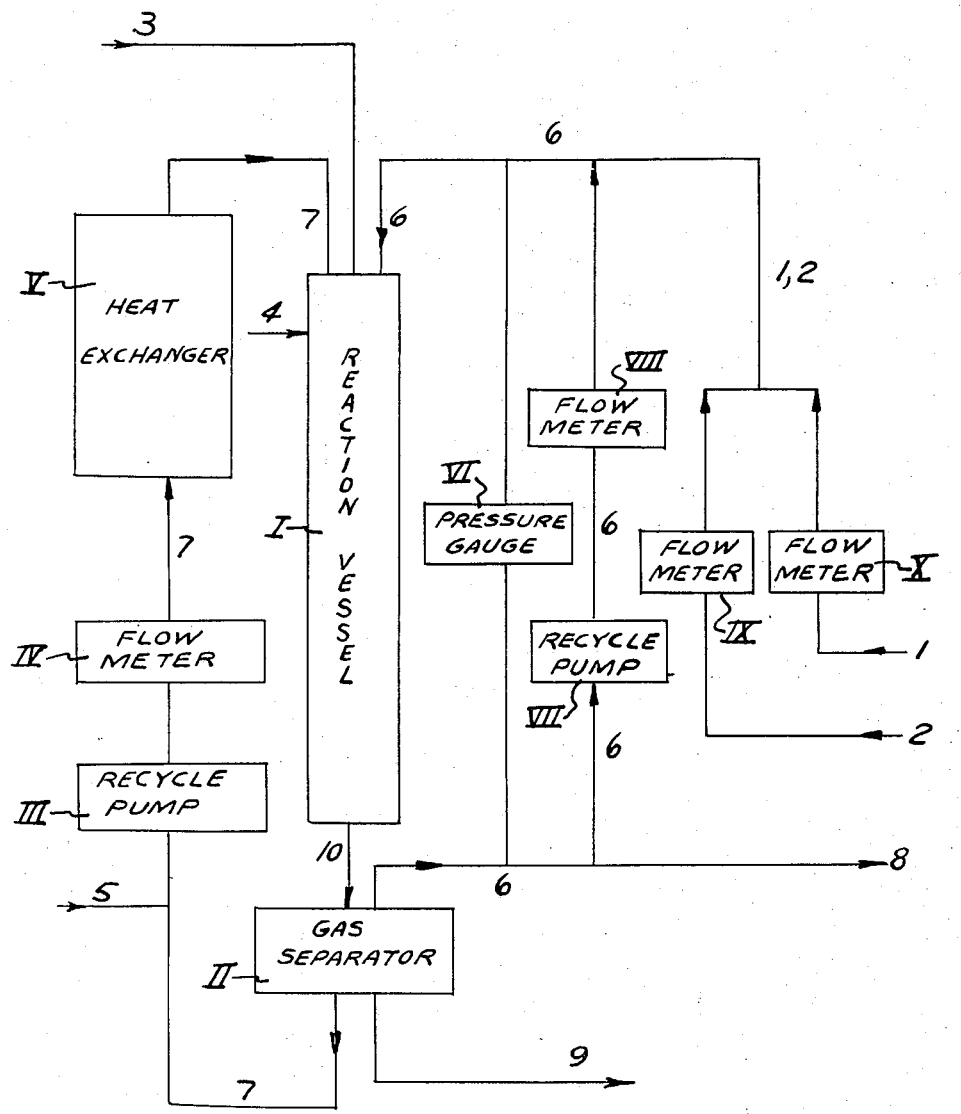

3,829,458
PROCEDURE FOR THE CONTINUOUS MANUFACTURE OF ORGANIC ISOCYANATES
Peter Horn, Ingelfingen, and Ludwig Schuster, Ludwigshafen, Germany, assignors to BASF Wyandotte Corporation, Wyandotte, Mich.
Filed Dec. 1, 1972, Ser. No. 311,217
Int. Cl. C07c *119/04*
U.S. Cl. 260—453 PH          4 Claims

ABSTRACT OF THE DISCLOSURE

A procedure for the manufacture of organic isocyanates from primary organic amines and phosgene in an inert organic solvent, characterized by carrying the reaction out continuously in packed reaction vessels, preferably by recycling the reaction mixture by means of the so-called transition flow.

BACKGROUND

1. Field of the Invention

This invention relates to a continuous process of manufacturing organic isocyanates from primary organic amines and phosgene in an inert organic solvent wherein the reaction mixture is recycled by means of the so-called transition flow.

2. Description of the Prior Art

The preparation of isocyanates from primary amines and phosgene is in itself known. Depending on the type of amine, the reaction is carried out either in the gas phase or in liquid phase and may be discontinuous or continuous (W. Siefken, Liebigs Ann., 562 75 (1949)).

Exothermic reactions between gases and liquids in the presence of solid catalysts may be carried out in such a manner that the liquid is allowed to trickle down over the catalyst used as packing in a packed column, while the gas is simultaneously fed in concurrent flow. This so-called trickle process results however in rather poor space time yields. Because of difficulties with heat removal local hot spots are observed at times, which frequently cause side product formation and/or result in damage to the catalyst itself.

It is known from a paper [A.I.Ch.E. Journal, Vol. 10 (1964), pages 951 to 957] that for the case of concurrent flow of a liquid and a gas through a packed column, the following flow regimes are observed, depending on the flow rates for the respective gas and liquid:

(1) During the Trickle Regime (gas continuous flow) the liquid trickles over the packing and the gas phase flows continuously through the voids in the bed. The liquid flows as a laminar film over the packing.
(2) In case of the Transition Flow Regime, the liquid moves in a turbulent manner through the packing bed.
(3) In case of the Pulsing Flow Regime, pulses, in form of a higher density waves, pass through the packed column with a certain frequency.

It is the object of this invention to manufacture organic isocyanates by means of a simple procedure and to do so with a high space time yield.

SUMMARY OF THE INVENTION

An improved process for making organic isocyanates comprising reacting in a transition flow regime (1) a primary organic amine in an inert organic solvent as the liquid phase, and
(2) a phosgene containing gaseous phase, said reaction being carried out at a temperature from 50 to 220 degrees centigrade by passing the mixture concurrently through at least one packed reaction vessel with throughput rates of liquid phase between 30 and 300 cubic meters per square meter per hour and throughput rates of gaseous phase between 10 and 3000 cubic meters per square meter per hour and after completion of the reaction the resulting reacted mixture is separated into a liquid phase and a gaseous phase and from the separated liquid phase is then recovered the isocyanate product.

With the new procedure, the packed bed is perfused by an intimate mixture of gas and liquid. It is for this reason that the isocyanates are obtained in significantly higher space time yields, by reaction of the amines with phosgene to carbamic acid chlorides and subsequent splitting off of hydrogen chloride, than by the conventional method of manufacture in a stirred reactor cascade. The reaction temperature can be controlled within a very narrow temperature range, so that no localized hot spots occur. This prevents the formation of side products, which can detrimentally affect the use characteristics of the isocyanates.

DESCRIPTION OF THE DRAWING

The attached drawing is a schematic flow sheet diagramming the process of this invention.

DESCRIPTION OF THE PREFERRED EMBODIMENT

The procedure according to this invention can be quite generally applied to the manufacture of any organic isocyanates which are obtainable by reacting amines with phosgene. Thus, mono-, di- or polyisocyanates can be prepared from the corresponding mono-, di- or polyamines.

Suitable organic mono-amino compounds are those with the formula R—$NH_2$, where R is selected from the group consisting of a substituted or non-substituted monofunctional, cycloaliphatic or aromatic radical, with from 1 to 20, preferably 2 to 12 carbon atoms. By way of example, specifically mentioned are aliphatic mono-amines, such as methylamine, ethylamine, butylamine, octylamine, and stearylamine; cycloaliphatic monoamines, such as cyclohexylamine; and aromatic mono-amines, such an aniline, toluidine, naphthylamine, chloroaniline and anisidine.

The technically important di- and polyisocyanates used in the manufacture of polyurethanes are prepared from the corresponding di- and polyamines according to the present invention. Suitable diamino compounds are characterized by the formula $H_2N$—R'—$NH_2$ where R' is selected from the group consisting of a divalent aliphatic or cycloaliphatic radical with from 2 to 18, preferably 4 to 12, carbon atoms, or a divalent aromatic radical which consists of one or several aromatic nuclei composed of 6 to 18 carbon atoms; said carbon atoms may be directly bonded to each other, or, as the case may be, may be joined via divalent bridging links such as —O—, —$SO_2$—, —$CH_2$—, and

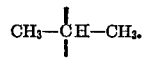

The diamino compounds may be used separately or as a mixture of components.

Such aliphatic or cycloaliphatic diamino compounds are, for instance, the following: 1,4-diaminobutane, 1,10-diaminodecane, 1,12-diaminododecane, 1,4-diaminocyclohexane, and preferably 1,6-diaminohexane, and 4,4'-diamino-dicyclohexyl. Typical aromatic diamino compounds are the following: 4,4'-diaminodiphenyl, 1,4- or resp. 1,3-phenylenediamine, 1,5- or resp. 1,8-naphthylenediamine, and preferably 2,4- or resp. 2,6-tolylenediamine and 2,2'-, 2,4'- or resp. 4,4'-diaminodiphenyl methane. The polyamines include tri-(p-aminophenyl)-methane and 2,4,6-triamino toluene, as well as such condensation products as may be obtained, from possibly substituted, aniline derivatives and aldehydes or resp. ketones in the presence of acids, for instance, polyphenyl-polymethylene-polyamines.

The other starting material used is phosgene. Gaseous phosgene may be used as such or diluted with such gases as nitrogen, helium or hydrogen chloride, which are inert under the reaction conditions.

As inert organic solvents, such compounds should be considered in which both the amines and the phosgene are at least partially soluble.

Chlorinated, aromatic hydrocarbons such as chlorobenzene, o-dichlorobenzene, p-dichlorobenzene, trichlorobenzenes, monochlorobiphenyl and alpha- or resp. beta-naphthalene chloride have been found especially useful. These solvents may be used singly or as mixtures. Advantageously, the solvent used should have a lower boiling point than the isocyanate which is to be prepared, so that the solvent is easily separated from the isocyanate by distillation. The amount of solvent is appropriately so chosen that the reaction mixture has a solids content from 3 to 30 percent by weight, preferably from 5 to 25 percent by weight, and especially from 8 to 20 percent by weight, based on the total weight of the reaction mixture.

The procedure, according to this invention, for the manufacture of isocyanates is appropriately carried out in one or more, for example, two sequentially arranged reaction vessels which contain packed beds, and using the so-called transition flow regime.

The generally column-like reaction vessels may have any desired cross-sectional shape, for instance, the cross-section may be a square or an ellipse. Preferably, however, long cylindrical reaction vessels are used. The ratio of internal diameter to reaction vessel length in general is from 1:2 to 1:100, preferably 1:10 to 1:40. The reaction vessels may be arranged vertically or horizontally or at in between angular positions. Preferably, however, vertically arranged reaction vessels are used.

The reaction vessels contain packing material, which, for instance, may be in the shape of spheres, rings, cylinders or in tablet form. When spheres are used, they generally have a diameter from 2 to 8 mm. Cylindrically shaped packing material generally uses cylinders with 2 to 15 mm. height and diameters from 2 to 6 mm. Packing material of other shapes generally have volumes corresponding to that of the cylindrical packing.

It is an essential characteristic of the novel procedure that the gaseous phase, consisting of phosgene and possibly an inert gas, and the liquid organic phase, containing the primary organic amine in solution and the corresponding amine hydrochloride or resp. carbamic acid chloride in suspension, are conveyed through the packed reaction vessel by the transition flow regime. Transition flow occurs at a liquid throughput of from 30 to 300 m.$^3$/m.$^2$ (cubic meters per square meter) per hour, preferably from 40 to 200 m.$^3$/m.$^2$ per hour, and especially so from 50 to 100 m.$^3$/m.$^2$ per hour and at a gas-phase throughput from 10 to 3000 m.$^3$/m.$^2$ per hour, preferably from 150 to 2500 m.$^3$/m.$^2$ per hour and especially so from 200 to 2300 m.$^3$/m.$^2$ per hour. In general, a suitable throughput rate is achieved, when the amount of liquid delivered to the upper end of the cylindrical reaction vessel does no longer voluntarily pass through the packed bed in the reaction vessel, but rather begins to back up at the entry site. The gaseous phase throughput rate can be chosen in such a manner that the amount of gas introduced at the entry site reacts completely during passage through the packed bed, or that excess gas component, which, as the case may be, can be inert gas, will exit at the other end of the reaction vessel. Adjustments in throughput rates to achieve the transition flow regime may, for instance, be made visually, as described in A.I.Ch.E. Journal, Vol. 10 (1964), p. 952–953 which is incorporated herein by reference.

When the conventional cylindrical reaction vessels, as known to the present technology, are used, a single pass of the reaction mixture generally does not result in complete transformation of the reagents. The reaction mixture is, therefore, separated with the aid of a gas separator into a liquid and a gaseous phase, after having passed through the reaction vessel. By means of this device, it is possible to further process both phases, independently or together, in a recycle procedure. For the case of incomplete reaction, the reaction mixture appropriately is recycled, for instance, two to forty times, through the packed reaction column. The amount of recycled reaction mixture may be from 5 to 99 percent by weight, preferably from 10 to 60 percent by weight, and especially from 15 to 40 percent by weight, based on the total throughput quantity of the liquid phase.

The amount of recycled reaction mixture depends on the reaction rate of the transformation and the heat of reaction which occurs. With the aid of the recycled quantity of reaction mixture, it is possible to hold the reaction temperature in the reaction zone within a narrow range, and thus to avoid temperature variations or resp. the occurrence of local hot spots which detrimentally affect the use characteristics of the isocyanates.

By a narrow temperature range a variation in temperature of $\pm 10°$ C., or preferably $\pm 5°$ C., is to be understood. For the reasons stated, the reaction is, therefore, preferably carried out by recycling part of the reaction mixture.

It is, however, also possible to achieve complete, or nearly complete, conversion with a single pass of the reaction mixture. This especially is the case when very long, narrow reaction vessels are employed, for instance, reaction vessels with a length to internal diameter ratio of from 1:50 to 1:100.

The process, according to this invention, is carried out in such a manner that the reaction mixture is cycled through the packed bed reaction vessel, the starting materials being introduced into the recycled reaction mixture before re-entry into the reaction vessel, and the reaction product being removed from the reaction mixture at any suitable location after leaving the reaction vessel before the location where additional starting components are introduced.

The continuous process can also be carried out in such a manner that the reaction mixture is passed through several, for instance, 2 to 5, sequentially arranged "recycle systems."

Individually, the organic mono-, di- and polyisocyanates are suitably manufactured in such a manner, that the corresponding primary organic amine and the phosgene, diluted with inert gas in a volume ratio of 1:1 to 1:0.01, preferably 1:0.5 to 1:0.05, are reacted in an inert organic solvent at reaction temperatures of 50° C. to 220° C., preferably at 90° C. to 180° C. The mole ratio of amine to phosgene is set in such a manner that per $NH_2$— group, 0.8 to 2.1 mole, preferably 1 to 1.3 mole phosgene is present in the reaction mixture.

The temperature at which the reaction is carried out should be higher than the decomposition temperature of the carbamide acid chloride which is formed as the intermediate product from the reaction of amine with phosgene. Depending on the type of amine used, this temperature is between from 50° C. to 220° C. Higher temperatures can be used but are not required.

A preferred method, exemplifying the process according to this invention, will be described with reference to the attached drawing.

The designated units in the schematic drawing are as follows:

I. Reaction Vessel
II. Gas Separator
III. Recycle Pump
IV. Flow Meter for the Recycled Liquid Phase
V. Recycle Heat Exchanger
VI. Differential Pressure Gauge
VII. Recycle Pump
VIII. Flow Meter for the Recycled Gaseous Phase
IX. Flow Meter for the Inert Gas
X. Phosgene Flow Meter 1. Phosgene supply line
2. Inert gas supply line
3. Inert organic solvent supply line
4.
and Feed lines for the amine solution
5.
6. Recycle system for gaseous phase
7. Recycle system for liquid phase
8. Off-gas line
9. Exit line for reaction products
10. Exit line from reaction vessel Via lines 1 and 2, or resp. 1, 2 and 6, phosgene is fed to reaction vessel I from the top, via flow meter X, inert gas is fed via flow meter IX. Via line 3, the same reaction vessel I is supplied with inert organic solvent from the top. The solution of primary organic amine is supplied to I via line 4 or via line 5 by feeding into the liquid recycle stream 7. The reaction mixture passes through reaction vessel I, containing packing material, in concurrent flow and in the so-called transition mode of flow. The reaction mixture exits 10 from the bottom of reaction vessel I. The gaseous components of the reaction mixture are then separated in gas separator II. The liquid phase of the reaction mixture is conveyed from the gas separator via recycle line 7 and recycle pump III, flow meter IV and recycle heat exchanger V back into the top of reaction vessel I. Part of the liquid reaction mixture from gas separator II is branched off via exit line 9, and the isocyanate formed is isolated from it. The gas phase, consisting of inert gas, hydrogen chloride, and possibly excess phosgene, is also carried in recycle via line 6, recycle pump VII and flow meter VIII. Via exit line 8, the off-gases, hydrogen chloride and possibly some inert gas and phosgene are taken off. The pressure differential between the reaction vessel feed lines and the exit line from the reaction vessel is measured by the differential pressure gauge VI.

The isocyanate containing reaction mixture, as prepared by this process, which has a solids content between from 3 to 30 percent by weight is then finish-processed by the conventional purification methods.

The process according to this invention is detailed further in the following examples.

EXAMPLE 1

A packed glass column I (see drawing), which is 1.3 m. long and had an internal diameter of 35.5 mm., was used for the reaction. The packing material in the column consisted of 5 mm. diameter spheres. The reaction vessel was filled with 1000 ml. of monochlorobenzene or contained previously prepared reaction mixture. The following reagents or components were fed to reaction vessel I at hourly rates:

via lines 6 or resp. 1, 2 or resp. 1 and via flow meter X, 37,000 ml. of phosgene, via line 2 and flow meter IX, 6,000 ml. nitrogen, and via feed lines 4 or 5, 1,040 ml. of an 8 percent by weight 2,4-diaminotoluene solution in monochlorobenzene.

After passing through the packed column, separation into a liquid reaction mixture and a gaseous phase occurs in gas separator II. The 185,000 ml./hr. of the liquid reaction mixture are recycled via line 7, recycle pump III, and flow meter IV, and recycle heater V. The nitrogen containing phosgene, in the amount of 5,000 ml./hr., is also recycled from gas separator II, via line 6, recycle pump VII and flow meter VIII.

The pressure differential between reaction vessel feed lines and reaction vessel exit lines is measured by means of the differential pressure gauge VI, and is found to be 0.3 kp./cm.$^2$. The reaction temperature in the column is 115° C. Via exit line 8, 38,000 ml./hr. off-gases are removed from the recycle system.

From gas separator II, via line 9, 1,040 ml./hr. of reaction mixture are removed from the system as reaction product. After distilling off the monochlorobenzene, the 2,4-tolylenediisocyanate is obtained in 92 percent yield, based on theory.

EXAMPLE 2

The isocyanate preparation is carried out in the same equipment and by the same procedure as detailed in Example 1.

The following reagents are being fed to reaction vessel I in hourly rates: 1,040 ml. of 8 percent by weight of 4,4'-diaminodiphenylmethane solution in monochlorobenzene, 32,000 ml. of phosgene and 5,000 ml. of nitrogen, 180,000 ml./hr. of liquid reaction mixture, and 5,000 ml./hr. of nitrogen containing phosgene are being recycled in the respective recycle systems. Via exit line 8, 31,000 ml./hr. of off-gases are removed from the gaseous recycle phase. From gas separator II, 1,040 ml./hr. of reaction mixture are removed. By distilling off the solvent, 96 percent of theoretical yield of 4,4'-diisocyanatodiphenylmethane are recovered.

EXAMPLE 3

For this example the equipment and process described in Example 1 are used.

In place of 2,4-diaminotoluene, a technical polyamine mixture consisting of diaminodiphenylmethane and polyphenylpolymethylene-polyamines is used, such a mixture can be obtained by the conventional condensation of aniline and formaldehyde in the presence of acids.

The following reagent components are fed to reaction vessel I at hourly rates: 1,040 ml. of 8 percent by weight polyamine solution in monochlorobenzene, 32,000 ml. phosgene and 6,000 ml. nitrogen. 185,000 ml./hr. of liquid reaction mixture, and 5,000 ml./hr. of nitrogen containing phosgene are recycled via the respective line systems. Via exit line 8 31,000 ml./hr. off-gases are removed from the recycle system. The pressure differential was found to be 0.3 kp./cm.$^2$. From the gas separator, 1,040 ml./hr. of reaction mixture are removed. After distilling off the solvent, a mixture of 4,4'-, 4,2'-, and 2,2'-diisocyanatodiphenylmethanes and polyphenyl-polymethylene-polyisocyanates is obtained in 100 percent theoretical yield, said mixture has an isocyanate number of 31 and a viscosity of 210 centipoises.

We claim:
1. An improved process for making organic isocyanates comprising reacting in a transition flow regime
   (1) a primary organic amine in an inert organic solvent as the liquid phase, and
   (2) a phosgene containing gaseous phase, said reaction being carried out at a temperature from 50 to 220 degrees centigrade by passing the mixture concurrently through at least one packed reaction vessel with throughput rates for the liquid phase of between 30 and 300 cubic meters per square meter per hour and for the gaseous phase of between 10 and 3,000 cubic meters per square meter per hour and after completion of the reaction the resulting reaction mixture is separated into a liquid phase and a gaseous phase and from the separated liquid phase is then recovered the isocyanate product.

2. The process according to claim 1 wherein the unreacted phosgene containing gaseous phase is recycled into the reaction vessel.

3. The process according to claim 1 wherein from 5 to 99 percent by weight of the initial liquid phase comprises separated liquid phase being recycled into the reaction vessel.

4. The process according to claim 1 wherein the recycling of the liquid and gaseous phases is done via separate recycle systems.

References Cited
UNITED STATES PATENTS

| | | | |
|---|---|---|---|
| 2,822,373 | 2/1958 | Beck | 260—453 |
| 3,226,410 | 12/1965 | Hettich et al. | 260—453 |
| 3,321,283 | 5/1967 | Ewald | 260—453 X |

LEWIS GOTTS, Primary Examiner

D. H. TORRENCE, Assistant Examiner